US009828484B2

(12) United States Patent
Brewer et al.

(10) Patent No.: US 9,828,484 B2
(45) Date of Patent: Nov. 28, 2017

(54) GRAPHENIC DISPERSIONS AND SLURRIES AND COATINGS THEREOF

(71) Applicant: Graphenix Development, Inc., Williamsville, NY (US)

(72) Inventors: John C. Brewer, Rochester, NY (US); Richard Allen Castle, Webster, NY (US); Kevin Tanzil, Rochester, NY (US)

(73) Assignee: Graphenix Development, Inc., Williamsville, NY (US)

( * ) Notice: Subject to any disclaimer, the term of this patent is extended or adjusted under 35 U.S.C. 154(b) by 73 days.

(21) Appl. No.: 14/410,470

(22) PCT Filed: Jun. 26, 2013

(86) PCT No.: PCT/US2013/047855
§ 371 (c)(1),
(2) Date: Dec. 22, 2014

(87) PCT Pub. No.: WO2014/004649
PCT Pub. Date: Jan. 3, 2014

(65) Prior Publication Data
US 2015/0337104 A1 Nov. 26, 2015

Related U.S. Application Data

(60) Provisional application No. 61/664,664, filed on Jun. 26, 2012.

(51) Int. Cl.
*C08K 3/04* (2006.01)
*C09D 171/00* (2006.01)
(Continued)

(52) U.S. Cl.
CPC ............... *C08K 3/04* (2013.01); *B82Y 30/00* (2013.01); *B82Y 40/00* (2013.01);
(Continued)

(58) Field of Classification Search
CPC ....................................................... C08K 3/04
See application file for complete search history.

(56) References Cited

U.S. PATENT DOCUMENTS

| 4,645,454 A | 2/1987 | Amdur et al. |
| 2010/0176351 A1* | 7/2010 | Ruoff ..................... B82Y 30/00 252/510 |

(Continued)

FOREIGN PATENT DOCUMENTS

| JP | 55-125119 A | 9/1980 |
| JP | 57-049281 A | 3/1982 |

(Continued)

OTHER PUBLICATIONS

International Search Report and Written Opinion of the International Searching Authority in corresponding International Application No. PCT/US2013/047855, mailed Aug. 26, 2013 (8 pages).

*Primary Examiner* — Lanee Reuther
(74) *Attorney, Agent, or Firm* — Andrew J. Anderson, Esq.; Harter Secrest & Emery LLP

(57) ABSTRACT

The present invention is particularly directed to graphenic dispersion and slurry compositions and the production and uses thereof, where these compositions exhibit one or more of the hallmark strength, thermal or electrical properties of "pure" graphene while at the same time being optimized in terms of solubility or other properties necessary for compatibility with one or more end processes. In specific embodiments, a composition of matter includes a graphenic mixture and at least one species of polymerized product of benzyl alcohol, and a method of making such composition of matter comprises sonicating the graphenic mixture in heated benzyl alcohol. In a further specific embodiment, a composition of matter is formed by sonicating a graphenic mixture in heated benzyl alcohol, wherein the resulting
(Continued)

composition exhibits a binder functionality in the absence of exogenous binder.

13 Claims, 2 Drawing Sheets

(51) Int. Cl.
*C01B 31/04* (2006.01)
*B82Y 30/00* (2011.01)
*B82Y 40/00* (2011.01)
*C09D 5/24* (2006.01)

(52) U.S. Cl.
CPC ............ *C01B 31/0484* (2013.01); *C09D 5/24* (2013.01); *C09D 171/00* (2013.01)

(56) References Cited

U.S. PATENT DOCUMENTS

| | | |
|---|---|---|
| 2010/0247892 A1 | 9/2010 | Lee et al. |
| 2011/0217544 A1 | 9/2011 | Young et al. |

FOREIGN PATENT DOCUMENTS

| | | | | |
|---|---|---|---|---|
| KR | 1020100127575 A | 12/2010 | | |
| KR | WO 2011136478 A2 * | 11/2011 | ............. | C08G 77/20 |
| WO | 2011/136478 A2 | 11/2011 | | |

\* cited by examiner

GRAPHENIC DISPERSIONS AND SLURRIES AND COATINGS THEREOF

FIELD OF THE INVENTION

The present invention is particularly directed to graphenic dispersion and slurry compositions, coatings thereof, and the production and uses thereof, where these graphenic dispersions, slurries, and coating compositions 1) exhibit one or more of the hallmark strength, thermal, electrical etc. properties of "graphene" in its generic sense, i.e., exhibit one or more properties of a "graphenic mixture" and 2) are additionally optimized for particular dispersion and/or slurry and/or coating properties.

BACKGROUND OF THE INVENTION

"Pure" Graphene and "Graphenic Mixtures"

The term "graphene" refers, in the strictest sense, to the two-dimensional (one-atom-thickness) allotrope of carbon with a perfect planar honeycomb lattice of carbon atoms, a material which, when layered on itself hundreds or thousands of times forms graphite, and when rolled forms carbon nanotubes ("CNTs"), but which, until 2004, had never been isolated in the single flat sheet form that represents "pure" graphene. In 2004, however, two scientists at the University of Manchester in the United Kingdom, Novoselov and Geim, used micromechanical cleavage to successfully draw a single sheet of "pure" two-dimensional graphene from a block of graphite, a technique that, in light of the actual apparatus originally used to accomplish it, is generally referred to as the "scotch tape" method. See, e.g., "The Rise of Graphene," Nature Nanomaterials 6 (2007): 183-191. This isolation of "pure" graphene for the first time was sufficiently revolutionary to result in the awarding of the Nobel in physics to these two scientists six years later, in 2010, as well as to spark a huge surge of research and development in the academic and industrial worlds into the unique properties of this material. See, e.g., See "Selling Graphene by the Ton," Nature Nanomaterials 4(2009):612-614.

Although the term "graphene" in theory describes only the "pure" two-dimensional single-sheet honeycombed lattice of carbon atoms, in fact this term is regularly used more loosely to refer to what would more aptly be termed "graphenic mixtures." Specifically, "graphene" is regularly used to denote not just "pure" graphene, but also 1) materials comprising multiple layers of "pure" graphene—in some examples 30 layers or more; 2) materials comprising a layer or layers containing more than carbon atoms, e.g., one or more layers modified facially (e.g., by epoxides), modified at the periphery by carboxyl groups, etc.; 3) materials comprising one or more layers that, because of facial and/or peripheral modifications (or for other reasons) contain defects in the arrangement of the carbon atoms, i.e., are not perfectly flat perfect honeycombs; 4) materials where there are non-carbon atoms in the carbonaceous layer; etc. Despite attempts to impose a standard nomenclature for what constitutes "graphene" (see, e.g., the terminology given by the International Union of Pure and Applied Chemistry, available at old.iupac.org/goldbook/G02683.pdf), at present the terminology is sufficiently diffuse that one recent article noted that, for example, Dow Chemical scientists are "still working through the process of exactly what it means to call something graphene." See "Selling Graphene by the Ton," Nature Nanomaterials 4(2009): 612-614.

Part of the problem with defining the meaning of "graphene" is that there is enormous commercial potential for materials that exhibit one or more of the hallmark properties of "pure" graphene, and such properties can manifest with mixtures of materials only some of which are "pure" graphene—i.e., in graphenic mixtures; therefore, both for sales and for marketing reasons such mixtures are frequently labeled "graphene" when they are not, at least not in the "pure" graphene sense. Specifically, "pure" graphene exhibits a number of remarkable physical properties, including: being the strongest material ever measured; having a thermal conductivity more than twice that of diamond; and, having an electron mobility among the highest of any semiconductor. See "Selling Graphene by the Ton," Nature Nanomaterials 4(2009): 612-614. However these strength, thermal and electrical properties also manifest to a varying extent in materials that are mixtures of "pure" graphene with, e.g., "few-layer" graphene (that is, a number of stacked sheets of "pure" graphene), facially- or peripherally-modified graphene sheets, etc., and such "graphenic mixtures" are consequently valuable in their own right, even though their mixed nature may make them inappropriate for academic studies of "pure" graphene.

Powdered (Dry) Bulk Graphenic Mixtures Vs. Graphenic Dispersions and Slurries

Since graphenic mixtures have enormous commercial potential in their own right, a number of companies have developed industrial-scale methods to produce such mixtures in bulk powder form for incorporation into various end products. Thus for example Angstron Materials, Vorbeck Materials and XG Sciences have all developed various processes for fracturing graphite into graphenic mixtures with varying contents of "pure" graphene and, consequently, varying graphene-like properties, which they then supply in powdered (dry) bulkform for other purposes, as well as for their own in-house uses. See, e.g., "Selling Graphene by the Ton," Nature Nanomaterials 4(2009): 612-614.

While such powdered (dry) bulk graphenic mixtures are appropriate for some applications, in many industrial processes it would be desirable to be able to supply such mixtures in particular dispersed or slurry forms in order to be compatible with the industrial processes using the particular graphenic mixtures to produce the final composition or product. Thus for example "pure" graphene consists of a honeycomb array of carbon atoms without any surface or peripheral chemical functionalities (i.e., a honeycomb of purely $sp^2$ carbon atoms without epoxides, hydroxides, carboxyl groups etc.); however, without such functionalities to increase polarity, this "pure" graphene is highly insoluble in water and therefore is difficult to use in aqueous or other polar solvent systems. By the same token, functionalized graphene is soluble in water or other appropriate polar solvents, but is insoluble in non-polar solvent systems. Thus an industrial process taking place in an aqueous (polar) environment requires either functionalized graphene or graphene (or a graphenic mixture) in an appropriate solvent/surfactant/suspension mixture for compatibility with such an aqueous solvent. Similarly, industrial applications involving a non-polar solvent system requires a graphenic mixture solution designed for such a non-polar solvent system.

In light of the above, it would be highly advantageous to develop methods for the production of compatible graphenic mixtures where these mixtures are optimized not for the content of "pure" or approximately "pure" graphene, but rather for the exhibition of one or more of the hallmark strength, thermal or electrical properties of "pure" graphene while at the same time being optimized in terms of solubility or other properties necessary for compatibility with one or more end processes.

SUMMARY OF THE INVENTION

The present invention is particularly directed to graphenic dispersion and slurry compositions, coatings thereof, and the production and uses thereof, where these graphenic dispersions, slurries, and coating compositions 1) exhibit one or more of the hallmark strength, thermal, electrical etc. properties of "graphene" in its generic sense, i.e., exhibit one or more properties of a "graphenic mixture" and 2) are additionally optimized for particular dispersion and/or slurry and/or coating properties.

In embodiment 1, the present invention is directed to a composition of matter comprising a graphenic mixture and at least one species of polymerized product of benzyl alcohol.

In embodiment 2, the present invention is directed to the composition of embodiment 1, where the at least one species of polymerized product of benzyl alcohol comprises at least one species of oligomer of benzyl alcohol.

In embodiment 3, the present invention is directed to the composition of embodiment 2, where the species of oligomer of benzyl alcohol comprises condensates of from 2 to 20 units of benzyl alcohol.

In embodiment 4, the present invention is directed to the composition of embodiment 1, where the at least one species of polymerized product of benzyl alcohol is formed by a mechanism other than simple condensation.

In embodiment 5, the present invention is directed to the composition of embodiment 1, where the at least one species of polymerized product of benzyl alcohol comprises between 1 and 80% (incrementing by 0.01% increments) of the total composition as measured on a weight basis.

In embodiment 6, the present invention is directed to the composition of embodiment 1, where the at least one species of polymerized product of benzyl alcohol is present in an amount sufficient to obtain dispersion or slurry formation of the graphenic mixture.

In embodiment 7, the present invention is directed to the composition of embodiment 1, where the at least one species of polymerized product of benzyl alcohol is present in an amount sufficient to obtain a loading of between 4 and 70% (incrementing by 0.1% increments) of the graphenic mixture.

In embodiment 8, the present invention is directed to the composition of embodiment 1, where a fraction of at least one species of polymerized product of benzyl alcohol is chemically coupled to at least one component of the graphenic mixture.

In embodiment 9, the present invention is directed to the composition of embodiment 8, where the at least one component of the graphenic mixture is selected from the group consisting of "pure" graphene, few-sheet graphene and mixtures and facial and peripherally altered derivatives thereof.

In embodiment 10, the present invention is directed to the composition of embodiment 9, where the chemical coupling to the graphenic mixture is primarily non-facial.

In embodiment 11, the present invention is directed to the composition of embodiment 8, where the fraction is between 0.5 and 40% (incrementing by 1% increments) of the at least one species of polymerized product of benzyl alcohol.

In embodiment 12, the present invention is directed to the composition of embodiment 1, where the at least one species of polymerized product of benzyl alcohol is present in an amount sufficient to obtain a loading of between 5 and 90% (incrementing by 1% increments) of the graphenic mixture.

In embodiment 13, the present invention is directed to the composition of embodiment 1, further comprising at least one surfactant or dispersant.

In embodiment 14, the present invention is directed to the composition of embodiment 13, where the at least one surfactant is selected from the group consisting of sodium dodecyl sulfate and sodium lauryl sulfonate.

In embodiment 15, the present invention is directed to the composition of embodiment 14, where the at least one surfactant is sodium dodecyl sulfate.

In embodiment 16, the present invention is directed to the composition of embodiment 1, further comprising at least one solvent.

In embodiment 17, the present invention is directed to the composition of embodiment 16, where the at least one solvent is selected from the group consisting of any of the graphenic mixture coatings carriers listed herein.

In embodiment 18, the present invention is directed to the composition of embodiment 16, where the at least one solvent is benzyl alcohol.

In embodiment 19, the present invention is directed to the composition of embodiment 1, further comprising at least one species of metal.

In embodiment 20, the present invention is directed to the composition of embodiment 1, further comprising at least one species of polymer monomer or polymer.

In embodiment 21, the present invention is directed to a method of making a composition of matter comprising a graphenic mixture and at least one species of polymerized product of benzyl alcohol, where the method comprises sonicating the graphenic mixture in heated benzyl alcohol.

In embodiment 22, the present invention is directed to the method of embodiment 21, where the heated benzyl alcohol is at a temperature of at least 100° F.

In embodiment 23, the present invention is directed to the method of embodiment 21, where the heated benzyl alcohol is at a temperature of between 100 and 200° F. (incrementing by 1° F. increments).

In embodiment 24, the present invention is directed to the method of embodiment 21, where the heated benzyl alcohol is at a temperature of about 150° F.

In embodiment 25, the present invention is directed towards a composition of matter formed by sonicating a graphenic mixture in heated benzyl alcohol, wherein the composition exhibits a binder functionality in the absence of exogenous binder.

In embodiment 26, the present invention is directed towards a composition of embodiment 25, formed by sonicating a graphenic mixture in benzyl alcohol heated to a temperature of at least 100° F.

In embodiment 27, the present invention is directed towards a composition of embodiment 25, formed by sonicating a graphenic mixture in benzyl alcohol heated to a temperature of from 100 to 200° F.

In embodiment 28, the present invention is directed towards a composition of embodiment 27, formed by sonicating a graphenic mixture in benzyl alcohol heated to a temperature of about 150° F.

In embodiment 29, the present invention is directed towards a composition of embodiment 25, formed by sonicating a graphenic mixture in benzyl alcohol heated to a temperature of from 100 to 200° F. at a frequency of less than 40 kHz.

In embodiment 30, the present invention is directed towards a composition of embodiment 25, formed by sonicating a graphenic mixture in benzyl alcohol heated to a temperature of from 100 to 200° F. at a frequency of about 20 kHz.

BRIEF DESCRIPTION OF THE DRAWINGS

The drawings provided in the present invention are provided solely to better illustrate particular embodiments of the present invention, and specifically do not provide an exhaustive or limiting set of embodiments of the present invention.

DETAILED DESCRIPTION OF THE INVENTION

Figure 1:
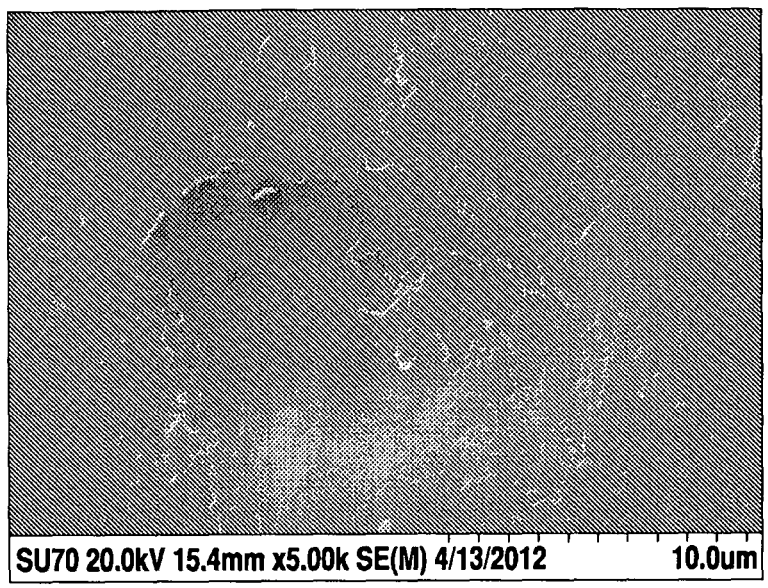
FIG. 1 provides a Scanning Electron Micrograph (SEM) image of a wiped area of a graphenic mixture coating experiment done on substrate (PET) using a graphenic mixture in solvent (Dowanol®) sonicated at 150° F. without exogenous binder. As this figure shows, in this binderless system there is only a residue of material left on the wiped area. See Example 1 for details.

Note that in the present invention, "a" or "an" are explicitly not limited to the singular form; instead, "a" and "an" are explicitly intended to be synonymous with "at least—but not limited to—one instance of" the term being referenced. Note also that, unless otherwise indicated, a range will be given as the beginning and end of the range and also the contemplated increment for the contemplated intermediate value(s) between the beginning and end of the range. Thus a phrase of the general form "a range of 5-50% (incrementing by 0.001%)" refers to a contemplated series of 5%, 5.001%, 5.002%, 5.003%, etc. (incrementing by 0.001% increments) up to the end value of 50%; a phrase of the form "less than about 5% decrementing by 0.01% decrements" refers to a contemplated series of 5%, 4.99%, 4.98%, etc. Note that "increment" and "interval" may be used synonymously, as may other synonymous usages.

The present invention is particularly directed to graphenic dispersion and slurry compositions, coatings thereof, and the production and uses thereof, where these graphenic dispersions, slurries, and coating compositions 1) exhibit one or more of the hallmark strength, thermal, electrical etc. properties of "graphene" in its generic sense, i.e., exhibit one or more properties of a "graphenic mixture" and 2) are additionally optimized for particular dispersion and/or slurry and/or coating properties. The present invention includes one such optimized system in which Benzyl Alcohol ("BA") is used as a combination solvent/binder system, based on the unexpected observation that, under certain conditions this BA system exhibits binder as well as solvent properties when employed with a graphenic material.

DEFINITIONS

As used herein, the term "graphene" will generally be preceded by a modifier or modifiers describing the kind or kinds of structures intended to be encompassed by the complete term of modifier (or modifiers)+"graphene." When the word "graphene" is used without a prior modifier, its meaning will be taken to be a graphenic mixture (see below) unless the context of the usage indicates otherwise (e.g., "graphene" as produced by the scotch tape method is taken to be "pure" graphene).

Thus "pure" graphene is used to describe a single molecule or multiple molecules (i.e., a composition) comprising only single-sheet $sp^2$ honeycombed carbon structure(s), where the sheet(s) is/are not modified facially (e.g., by epoxide(s)) or at the periphery (e.g., by carboxyl group(s)) and have a perfect $sp^2$ honeycombed structure (i.e., have no defects in the structure such as to cause wrinkling or deformation).

In addition to "pure" graphene as defined above, the present application may also refer to graphene in the context of the number of layers of single-layer graphene present. Thus "single-layer" graphene refers to a composition which is composed only of single sheet/layer graphene compositions; "two-layer" graphene refers to a composition which is composed only of paired (stacked) sheets/layers of graphene as well as single-layer/sheet graphene; and, "few-layer" graphene refers to a composition where the graphene can be a mixture of single-sheet up to nine-sheet stacked graphene. Note that the terms "single-layer," "two-layer" and "few-layer" graphene are explicitly not intended to specify (i.e., limit) the chemical modification(s) (facial/peripheral), wrinkling, etc. properties of the material but rather specify only the number of layers. Chemical modification, wrinkling, etc. will be explicitly specified when appropriate and, absent such specification, the terms "single-layer," "two-layer" and "few-layer" graphene will encompass both unmodified, unwrinkled, modified, wrinkled etc. graphene structures and combinations thereof without limitation.

"Chemically Modified" graphene or, synonymously, "CM-graphene" refers generically to single-layer, two-layer or/and few-layer graphene that has either modifications to one or more of the facial surfaces, one or more of the peripheries (edges), or both; CM-single-layer graphene, CM-two-layer graphene and CM-few-layer graphene refer more specifically to these particular forms of graphene that have been facially and/or peripherally chemically modified.

"Non-Covalently Modified" graphene ("NCM-graphene") refers generically to "pure", single-layer, two-layer or/and few-layer graphene which has one or more molecules associated with it in a non-covalently-bonded fashion, e.g., associated by stacking (π-π interaction(s)), hydrogen bonding, etc., with such molecules including any such molecules known in the art including carbonaceous compounds (non-aromatic and aromatic), metals, etc. NCM-single-layer graphene, NCM-two-layer graphene and NCM-few-layer graphene refer more specifically to these particular forms of graphene that have been non-covalently modified in one or more of the ways described above. Note that in a mixture of different types of graphene there may be both covalently- and non-covalently-modified graphene, and that even a single sheet of graphene can be both CM- and NCM-modified.

As used herein, the term "graphenic material" (synonymously, "graphenic mixture" or "graphenic composition") refers to a material that contains at least one or more species of "pure", single-layer, two-layer or/and few-layer graphene and displays one or more properties associated with graphene. Thus a graphenic material refers to a mixture with one or more "pure", single-layer, two-layer or/and few-layer graphene components that—in its bulk—exhibits one or more properties of graphene. Unless otherwise explicitly indicated, "graphenic material" and its synonyms encompasses compositions comprising no/any/all modifications such as CM- and NCM-modifications, as well as wrinkled, ribboned, natural and synthetic forms, intercalated and non-intercalated single-layer, two-layer or/and few-layer graphene, chemically-functionalized graphene, etc.

The presence of "pure", single-layer, two-layer or/and few-layer graphene in a composition may be determined by various methods, including without limitation microscopy methods such as AFM, TEM, SEM, and the like, spectroscopic methods such as Raman spectroscopy, as well as other methods as would be known to one of ordinary skill in the art of carbon allotrope identification and characterization. A graphenic mixture may be generically described as such; the description may also more precisely specify the graphenic mixture in terms of, e.g., the content (e.g., wt %) of one or more of its components (e.g., "a graphenic mixture that is at least 1%, 2%, 3%, 4%, . . . , <100% (Applicants note that although the preceding series is incremented by 1% increments, smaller increments such as 0.1%, 0.01% etc. are explicitly contemplated) "pure", single-layer, two-layer or/and few-layer graphene . . . "), the exhibition by the graphenic mixture of one or more defined properties such as, e.g., electrical conductivity, thermal conductivity, strength, surface area, etc.

The graphenic mixtures of the present invention may be graphite free or essentially graphite free; these mixtures may also contain varying amounts of graphite. The term "graphite" refers to any form of graphite, including without limitation natural and synthetic forms of graphite, including, for example, crystalline graphites, expanded graphites, exfoliated graphites, and graphite flakes, sheets, powders, fibers, pure graphite, and graphite. When graphite is present, one or more graphitic carbons can have the characteristics of a carbon in an ordered three-dimensional graphite crystalline structure comprising layers of hexagonally arranged carbon atoms stacked parallel to each other. The presence of a graphitic carbon can be determined by, e.g., X-ray diffraction. As defined by the International Committee for Characterization and Terminology of Carbon (ICCTC, 1982), and published in the Journal Carbon, Vol. 20, p. 445, a graphitic carbon can be any carbon present in an allotropic form of graphite, whether or not the graphite has structural defects.

As used herein, the terms "dispersion" and "slurry" are intended to be interchangeable (unless otherwise indicated) with "suspension," which refers to a mixture comprising a liquid and a material suspended therein. Generally, the material suspended in the liquid is not dissolved nor substantially aggregated, but rather distributed within \the liquid. A material can be suspended in a liquid. However, it is not necessary that any portion of the suspended material be partially or wholly dissolved in the liquid. In one aspect, a suspension can comprise only one or more suspended materials disposed in one liquid or a mixture of liquids. In another aspect, a suspension can comprise a solution, where "solution" refers to the situation that one obtains when all of a suspended material is dissolved in the liquid or mixture of liquids. In yet another aspect, a suspension can comprise one or more suspended materials disposed in one or more liquids, wherein a portion of the suspended material is also dissolved in the one or more liquids. When a suspension is disclosed herein as being "substantially homogenous," this is meant to refer to a mixture comprising a liquid having a material dispersed substantially throughout the liquid. To determine whether or not a suspension is "substantially homogenous," a suspension can be, for example, visually inspected. If a suspension comprises deposits or obvious aggregates, the suspension is not "substantially homogenous." Other methods include, for example, X-ray diffraction, sedimentation analysis, among others. If a solution or suspension comprises one or more aggregates that can be easily re-dispersed by, for example, sonication, such a solution can be substantially homogeneous, and the present disclosure is not intended to exclude such solutions or suspensions by the mere presence of an easily dispersible aggregate.

The present invention is also directed to coating compositions comprising graphenic dispersions or slurries. Such coatings may optionally comprise one or more carriers in which some or all of the components are dissolved, suspended, or otherwise dispersed or carried. Examples of suitable graphenic dispersion or slurry coatings carriers include, but are not limited to, water, distilled or synthetic isoparaffinic hydrocarbons (such Isopar® and Norpar® (both manufactured by Exxon), citrus terpenes and mixtures containing citrus terpenes (such as Purogen, Electron, and Positron (all manufactured by Ecolink)), terpenes and terpene alcohols (including terpineols, including alpha-terpineol), limonene, aliphatic petroleum distillates, alcohols (such as methanol, ethanol, n-propanol, i-propanol, n-butanol, i-butanol, sec-butanol, tert-butanol, pentanols, i-amyl alcohol, hexanols, heptanols, octanols, diacetone alcohol, butyl glycol, etc.), ketones (such as acetone, methyl ethyl ketone, cyclohexanone, i-butyl ketone, 2,6,8, trimethyl-4-nonanone etc.), esters (such as methyl acetate, ethyl acetate, n-propyl acetate, i-propyl acetate, n-butyl acetate, i-butyl acetate, tert-butyl acetate, carbitol acetate, etc.), glycol ethers (such as Dowanol® (manufactured by Dow)), ester and alcohols (such as 2-(2-ethoxyethoxyl)ethanol, propylene glycol monomethyl ether and other propylene glycol ethers; ethylene glycol monobutyl ether, 2-methoxyethyl ether (diglyme), propylene glycol methyl ether (PGME); and other ethylene glycol ethers; ethylene and propylene glycol ether acetates, diethylene glycol monoethyl ether acetate, 1-methoxy-2-propanol acetate (PGMEA); and hexylene glycol (such as Hexasol™ (supplied by Special-Chem)), imides, amides (such as dimethyl formamide, dimethylacetamide, etc.), cyclic amides (such as N-methylpyrrolidone and 2-pyrrolidone), lactones (such as beta-propiolactone, gamma-valerolactone, delta-valerolactone, gamma-butyrolactone, epsilon-caprolactone), cyclic imides (such as imidazolidinones such as N,N'-dimethylimidazolidinone (1,3-dimethyl-2-imidazolidinone)). and mixtures of two or more of the foregoing and mixtures of one or more of the foregoing with other carriers. Solvents may be low- or non-VOC solvents, non-hazardous air pollution solvents, and non-halogenated solvents. The graphenic mixture compositions of the invention may further include at least one surfactant or dispersant, and in a particular embodiment may include a surfactant selected from the group consisting of sodium dodecyl sulfate (SDS) and sodium lauryl sulfonate (SLS).

The graphenic dispersions and slurries of the present invention are generally intended for ultimate use as a component of other compositions, materials, and coatings. The graphenic dispersions, slurries and coatings of the present invention are intended for use, e.g., in a variety of applications including, without limitation, for electrical applications including (but not limited to), dielectrics, conductive traces or surfaces (e.g., as would be formed via graphenic dispersion and slurry containing conductive inks), energy storage device electrodes (e.g. ultracapacitor electrodes); for coatings for thermal management (i.e., to improve heat transfer/dissipation in various devices, including, e.g., in ultracapacitor electrodes); for coatings for strength; for combinations of the above; etc. The list of such applications includes (but is not limited to) any use of a graphenic material as would be contemplated by one of ordinary skill in the art of the use of such materials. Depending upon desire applications, the graphenic dispersion and slurry compositions of the invention may in certain embodiments include further components such as at least one metal species, and/or at least one species of polymer monomer or polymer.

In light of these different contemplated applications for the graphenic dispersion and slurry coatings of the present invention, assays to measure the success ("quality" etc.) of the graphenic coating will depend upon the endpoint use for that coating. Thus a successful coating for an electrical application will typically have a volume resistivity (as measured by, e.g., four-point probe measurements) (such as, for example, a volume resistivity of less than 0.9 ohm-cm, e.g., less than 0.9 ohm-cm decrementing by 0.0001 ohm-cm), as well as adherence to substrate (particularly if the substrate is a flexible substrate such as PET), wear properties (which may differ depending upon whether the coating will be used as, e.g., a conductive trace, versus use as a contact point for a push-button or keyboard button), low incidence of pinholes or other defects, etc. A successful coating for thermal management will have the appropriate thermal properties, adhesion, lack of defects, etc. A successful coating for a strength application will exhibit the appropriate strength characteristics, etc.

Applicants note that, although graphenic dispersion and slurry coatings are particularly contemplated in the present invention, one or more graphenic dispersion and slurry will necessarily serve as the basis for a graphenic dispersion and slurry coatings; therefore, the present invention also contemplates the measurement of "success" in the context of graphenic dispersions and slurries as well as in the context of graphenic dispersion and slurry coatings. In this regard, various assays for optimized graphenic dispersion and slurry properties include (but are not limited to): loading of graphenic material, viscosity, settling time for graphenic material, etc.

As shown in the Examples below, in the course of developing graphenic dispersion and slurry coatings, Applicants typically have used graphenic dispersions and slurries containing a chemical component exhibiting a "binder" property, that is, a component that is important for adherence of the coating to the substrate. As Example 1 shows, in the absence of binder, wiping after coating and drying removes all but a trace residual amount of the coating, i.e., under these standard conditions an exogenous binder is required for substantial adherence.

As Example 2 shows, when Benzyl Alcohol ("BA") was used as a carrier for the graphenic material—again without added binder—under the conditions used in this Example there is an unexpected manifestation of binder function. Note that the results of Example 2 were originally observed when sonication was done in the late afternoon, when the sonication bath had been used all day. That is, Applicants unexpectedly observed that when experiments were done with bath temperature unusually high due only to chance conditions at the end of the day, binder function manifested itself in this binderless system. As Example 3 shows, after this unexpected effect was observed, Applicants performed controlled experiments to determine the effect of sonication bath temperature on binder function; these experiments show that the manifestation of such binder function is indeed an effect of bath temperature, with a 90° F. bath inadequate for providing the adherence (and therefore binder function) that manifests with a 150° F. sonication bath.

Although not bound by any particular theory as to how BA sonicated at 150° F. (generically "high temperature BA," that is, at a temperature significantly above 90° F., e.g., at least 100° F. and preferably from 100 to about 200° F., more preferably about 150° F.) is able to provide binder function, Applicants note that it is possible that under these conditions BA forms oligomeric or polymeric condensation products (note that Applicants intend that "oligomer" refers to a polymer generally of less than about 20 monomeric repeats, i.e., that "oligomer" refers to a relatively short polymer), and that these polymeric products act to provide binder function. Applicants note that this is only one possible mechanism for the results observed, and should not be considering limiting with respect to all embodiments of the present invention. While sonication may be performed at various frequencies, lower frequency (e.g., less than 40 kHz, and in a specific embodiment about 20 kHz) sonication is preferred.

Figure 3:
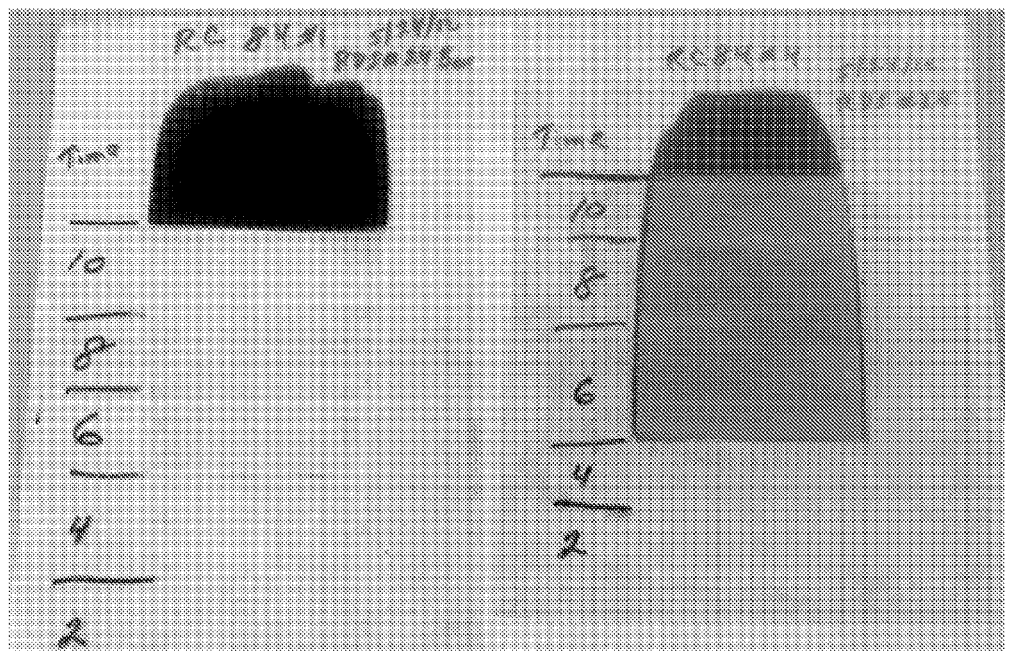
FIG. 3 provides two different coatings on PET, with the left panel corresponding to coated conductive carbon black and the right panel corresponding to a coated graphenic mixture. In both cases sonication of the coating composition was done at 150° F. in BA without exogenous binder; in the left and right panels the top portion of the coatings (to the right of "Time") were not wiped, while the remaining portions were wiped after various drying times as shown. These results show the unexpected result that the binder function in the BA system does not manifest when carbon black is used rather than a graphenic mixture; thus the carbon source appears to affect the manifestation of binder function. See Example 4 for details.

Applicants also note that, as Example 4 shows, this binder function is also unexpected in that it manifests as a function of the source of carbonaceous material, with binder function manifesting with the use of a graphenic mixture (Example 4 and FIG. 3, right panel) but not with (the non-graphenic mixture) carbon black (Example 4 and FIG. 3, left panel). There may be a number of explanations for this effect, including possibly the pH of the carbonaceous material source (pH is known to have an effect on the formation of condensates), specific binder chemistry resulting from the properties of one or more components of the graphenic mixture (e.g., manifesting as a result of surface or peripheral chemical moieties on the graphene flakes), etc. Note that none of these possible explanations should be taken as limiting; rather, Applicants offer them only as various non-limiting formal possibilities rather than as demonstrated mechanisms.

Applicants note that the unexpected binder function observed serendipitously in the BA system at high sonication temperature may have a number of beneficial effects, including, for example, increased graphenic material loading by way of reduction of exogenous binder, better adherence relative to that obtained with typical exogenous binder(s), etc. Applicants also note that possible covalent products of this system include: 1) BA oligomers or polymers; 2) BA oligomers or polymers in which graphenic material is entrapped; 3) reaction product(s) in which BA, oligomers or BA or polymers of BA is/are covalently attached to one or more of the components of the graphenic mixture (e.g., cross-linking at the periphery of the graphene sheets, facial crosslinking, both peripheral and facial cross-linking, etc.). Applicants again emphasize that none of these possible reaction products are intended to be limiting with respect to all embodiments of the present invention.

Graphenic material employed in the following examples was obtained from graphene nanoplatelet agglomerates containing parent particles of approximately 5 micrometer average diameter and approximately 6 nanometer thickness exposed to the described ultrasonic dispersing and exfoliating conditions.

Example 1—Adherence of Graphenic Material in Solvent Without Binder

Graphenic material in a typical carrier (Dowanol® DPM/TPM 2:1 blend) was sonicated for 2 hrs. in a 150° F. bath at 20 kHz. An aliquot of the sonicated solution was then coated on untreated PET with RDS bar #24. After oven drying @ 100° C. for 6 min, an area of the resulting coating was wiped with a lint free wipe. Visual inspection of the wiped, coated PET does not show any appreciable amount of adhered material. To investigate more closely, SEM imaging of the wiped area was then performed, with the result obtained in FIG. 1. (Experiment Internal Ref. RC60-1.1). As this figure shows, in this binderless system there is only a trace, if any, residue of material left on the wiped area.

Figure 2:
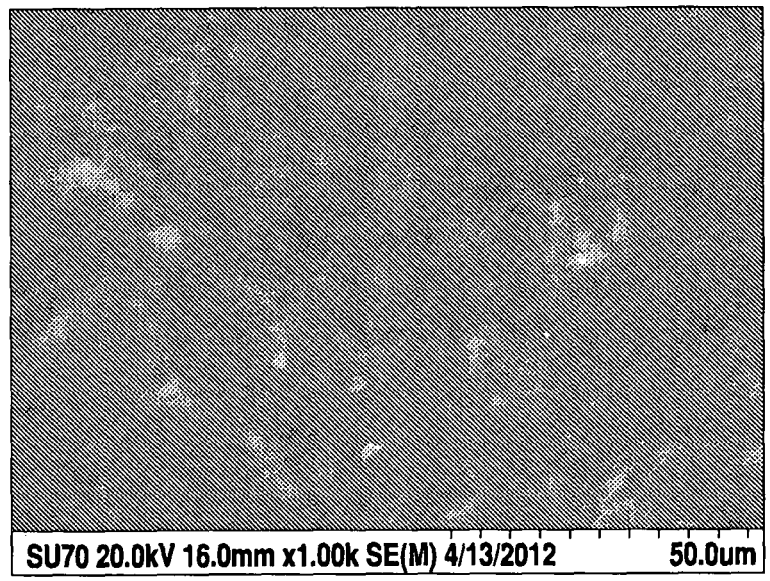
FIG. 2 provides a SEM image of a wiped area of a graphenic mixture coating experiment done on PET using a graphenic mixture in solvent (Benzyl Alcohol or "BA") sonicated at 150° F., again without exogenous binder. As this figure shows, under the experimental conditions used there is a significant amount of residual material remaining after wiping, even though no exogenous binder was added. This result reveals an unexpected binder function that manifests in the system under the conditions used. See Example 2 for details.

Example 2—Adherence of Graphenic Material in Benzyl Alcohol without Exogenous Binder Graphenic material in benzyl alcohol (BA) carrier without exogenous binder was sonicated for 2 hrs. in a 150° F. bath at 20 kHz. An aliquot of the sonicated solution was then coated on untreated PET with RDS bar #24. After drying @ 100° C. for 6 min, an area of the resulting coating was wiped with a lint free wipe. SEM imaging of the wiped area was then performed, with the result obtained in FIG. 2. (Experiment Internal Ref. RC60-3.1). This figure shows that, although this system lacks any exogenous binder component, under the conditions used there is an unexpected manifestation of a binder function, in that there is a significant amount of material still remaining on the wiped area. This wiped area was observed to be gray in color, which would be consistent with graphenic material residue remaining in this area.

Example 3—Effects of Sonication Temperature on Adherence in BA

Experiments were performed without exogenous binder using graphenic material sonicated for 2 hrs. at either 90° F. or 150° F. before coating, oven drying (4 min) and then wiping post-drying. These results (data not shown) indicate that, at the higher sonication temperature, adherence of the resulting coating occurred, versus effectively little to no adherence at the lower sonication temperature. These results suggest that adherence is at least partially a result of sonication temperature. Applicants again note that, as described previously, the effect of bath temperature was not predicted and was instead only serendipitously observed when sonication was performed in the late afternoon, in water baths that had been used for sonication all day and were warm as a result.

Example 4—Effects of Graphenic Material in BA Versus Carbon Black in BA

Experiments were conducted with sonication at 150° F. for 2 hrs in BA without exogenous binder using either graphenic material or carbon black as the carbonaceous component of the experiment. After coating and various oven drying times, the resulting coatings were wiped as described. The results obtained (see FIG. 3 and the legend to this figure) show the unexpected result that the binder function observed in the BA system+graphenic mixture (right panel of FIG. 3) does not manifest when carbon black is instead used (left panel of FIG. 3); thus the carbon source appears to affect the manifestation of binder function.

What is claimed is:

1. A composition of matter formed by sonicating a graphenic mixture in benzyl alcohol heated to a temperature of at least 100° F., wherein the composition exhibits a binder functionality in the absence of an exogenous binder.

2. A composition of matter according to claim 1, formed by sonicating the graphenic mixture in benzyl alcohol heated to a temperature of from 100 to 200° F.

3. A composition of matter according to claim 2, formed by sonicating the graphenic mixture in benzyl alcohol heated to a temperature of about 150° F.

4. A composition of matter according to claim 2, comprising a loading of between 5 and 90 wt % of the graphenic mixture and the absence of an exogenous binder.

5. A composition of matter according to claim 3, comprising a loading of between 5 and 90 wt % of the graphenic mixture and the absence of an exogenous binder.

6. A composition of matter according to claim 1, formed by sonicating the graphenic mixture in benzyl alcohol heated to a temperature of from 100 to 200° F. at a frequency of less than 40 kHz.

7. A composition of matter according to claim 6, comprising a loading of between 5 and 90 wt % of the graphenic mixture and the absence of an exogenous binder.

8. A composition of matter according to claim 1, formed by sonicating the graphenic mixture in benzyl alcohol heated to a temperature of from 100 to 200° F. at a frequency of about 20 kHz.

9. A composition of matter according to claim 8, comprising a loading of between 5 and 90 wt % of the graphenic mixture and the absence of an exogenous binder.

10. A composition of matter according to claim 1, comprising a loading of between 5 and 90 wt % of the graphenic mixture and the absence of an exogenous binder.

11. A method of making a composition of matter of claim 1, comprising sonicating the graphenic mixture in benzyl alcohol heated to a temperature of at least 100° F.

12. The method of claim 11, where the heated benzyl alcohol is at a temperature of between 100 and 200° F. and the sonicating is at a frequency of less than 40 kHz.

13. The method of claim 11, where the heated benzyl alcohol is at a temperature of about 150° F. and the sonicating is at a frequency of about 20 kHz.

* * * * *